US008290331B2

(12) United States Patent
Redmann et al.

(10) Patent No.: US 8,290,331 B2
(45) Date of Patent: Oct. 16, 2012

(54) SPACER BOX AND INTERBAY CABLE MANAGEMENT PANEL

(75) Inventors: Timothy M. Redmann, Carver, MN (US); Joy McKnight, Carver, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 251 days.

(21) Appl. No.: 12/603,857

(22) Filed: Oct. 22, 2009

(65) Prior Publication Data
US 2010/0135632 A1 Jun. 3, 2010

Related U.S. Application Data

(60) Provisional application No. 61/108,325, filed on Oct. 24, 2008.

(51) Int. Cl.
*G02B 6/00* (2006.01)
*B23P 11/00* (2006.01)
(52) U.S. Cl. .......... 385/135; 385/134; 385/100; 29/428
(58) Field of Classification Search .................. 385/134, 385/135, 136, 137, 53, 100; 29/428
See application file for complete search history.

(56) References Cited

U.S. PATENT DOCUMENTS

| | | | | |
|---|---|---|---|---|
| 4,991,927 | A * | 2/1991 | Anstey | 385/53 |
| 4,995,688 | A | 2/1991 | Anton et al. | |
| 6,427,936 | B1 * | 8/2002 | Noel et al. | 242/399 |
| 6,571,047 | B1 * | 5/2003 | Yarkosky et al. | 385/135 |
| 7,939,763 | B2 * | 5/2011 | Jones et al. | 174/101 |
| 2001/0015598 | A1 * | 8/2001 | Sevier | 312/265.1 |
| 2004/0175088 | A1 | 9/2004 | Dagley et al. | |
| 2009/0090533 | A1 * | 4/2009 | Jones et al. | 174/95 |
| 2010/0135632 | A1 * | 6/2010 | Redmann et al. | 385/135 |

OTHER PUBLICATIONS

ADC Telecommunications, Inc. document, "Fiber Distribution Frame Interbay Fiber Management Panel and End Guard Panel Installation Instructions," ADCP-90-137, Issue 9, dated Jan. 2001 (1056847 Rev B), 13 pages.
ADC Telecommunications, Inc. document, "Adjustable Based Filler Installation Instructions," ADCP-92-078, Issue 2, dated Apr. 2007 (1400014 Rev B), 6 pages.
ADC Telecommunications, Inc. document, "Unequal Flange Rack Installation Instructions," ADCP-80-345, Issue 4, dated Feb. 2001 (1017778 Rev B), 43 pages.
ADC Telecommunications, Inc. engineering drawing No. 1398082, Revision C, dated Jul. 5, 2007, 2 pages.
ADC Telecommunications, Inc. engineering drawing No. 1268535, Revision A, dated Jul. 21, 2003, 1 page.
International Search Report and Written Opinion mailed Mar. 10, 2010.

* cited by examiner

*Primary Examiner* — Brian Healy
(74) *Attorney, Agent, or Firm* — Merchant & Gould P.C.

(57) ABSTRACT

The present disclosure is directed at an interbay management system including a front spacer, a rear spacer, and an optional mid spacer that are coupled together and connected to a cable management panel. The assembly can be secured adjacent to or between distribution frames. The modular construction of the spacer allows for easy installation, and the variable length enables the spacer to be easily configured to correspond to the type and size of the telecommunication components that are to be supported in the distribution frame.

18 Claims, 14 Drawing Sheets

FIG.10
FIG.11
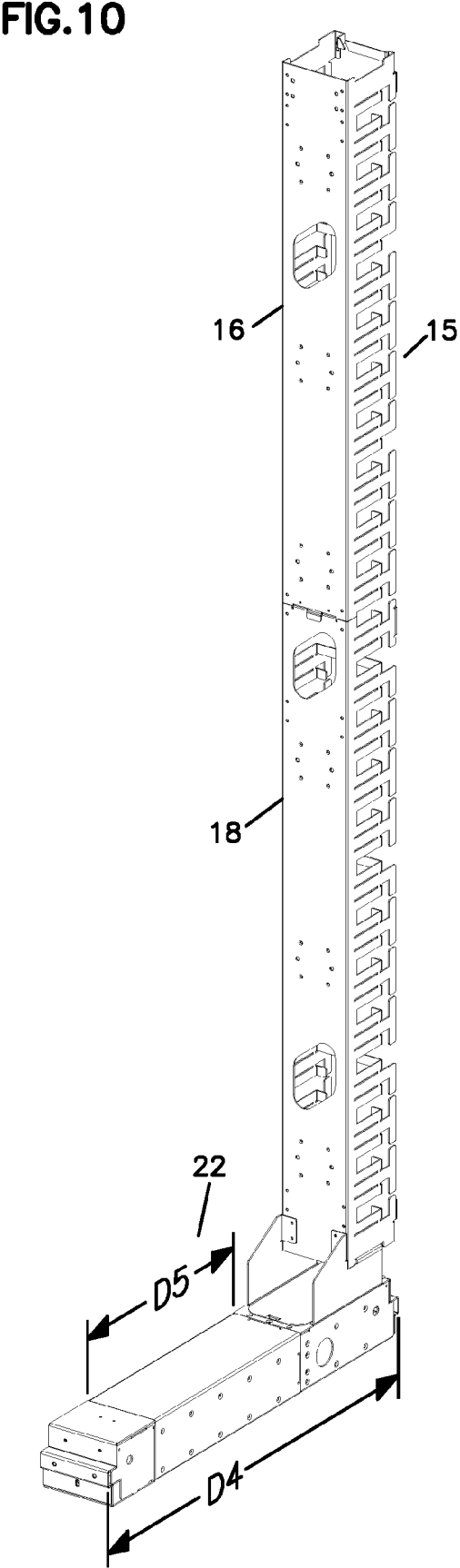
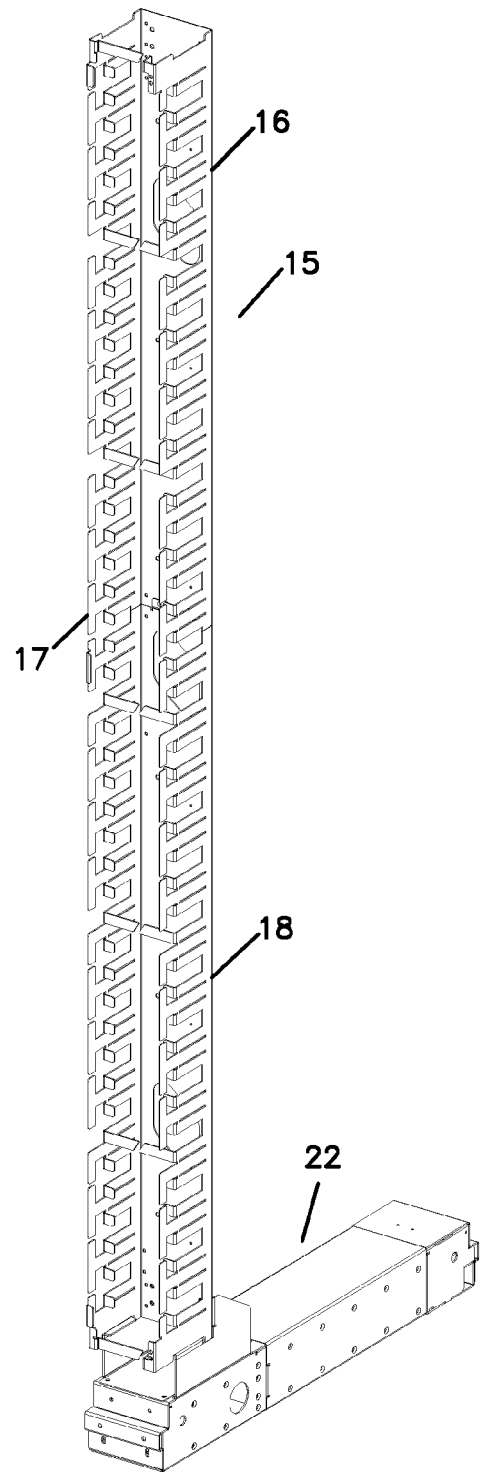

SPACER BOX AND INTERBAY CABLE MANAGEMENT PANEL

CROSS REFERENCE TO RELATED APPLICATIONS

This application claims the benefit of provisional application Ser. No. 61/108,325, filed Oct. 24, 2008, which is incorporated herein by reference in its entirety.

TECHNICAL FIELD

A telecommunication cable management system for use between or adjacent to fiber distribution bays or frames.

BACKGROUND

A fiber distribution frame can be used to support telecommunication components that are connected to other telecommunication components via telecommunication cables, such as patch cords. Slack in these cables can be taken up in cable management systems that are typically located adjacent the fiber distribution frames. The cable management systems protect the cables and keep them organized and out of the way. When multiple fiber distribution frames/racks are used, the cable management systems are often mounted between adjacent fiber distribution frames. Since the fiber distribution frame can be used to support a wide variety of telecommunication components, there is a need for improved cable management systems.

SUMMARY

The present disclosure is directed at an interbay management panel connected to a spacer block that includes a front spacer, a rear spacer, and an optical mid spacer. The assembly can be secured adjacent to or between distribution frames. The modular construction of the spacer box allows for easy installation, and the variable length enables the spacer box to be easily configured to correspond to the type and size of the telecommunication components that are to be supported in the distribution frame.

BRIEF DESCRIPTION OF THE FIGURES

FIG. 10 is a rear perspective view of the embodiment of the interbay management system in a second configuration;

FIG. 11 is a front perspective view of the embodiment of the interbay management system in a second configuration;

DETAILED DESCRIPTION

Figure 1:
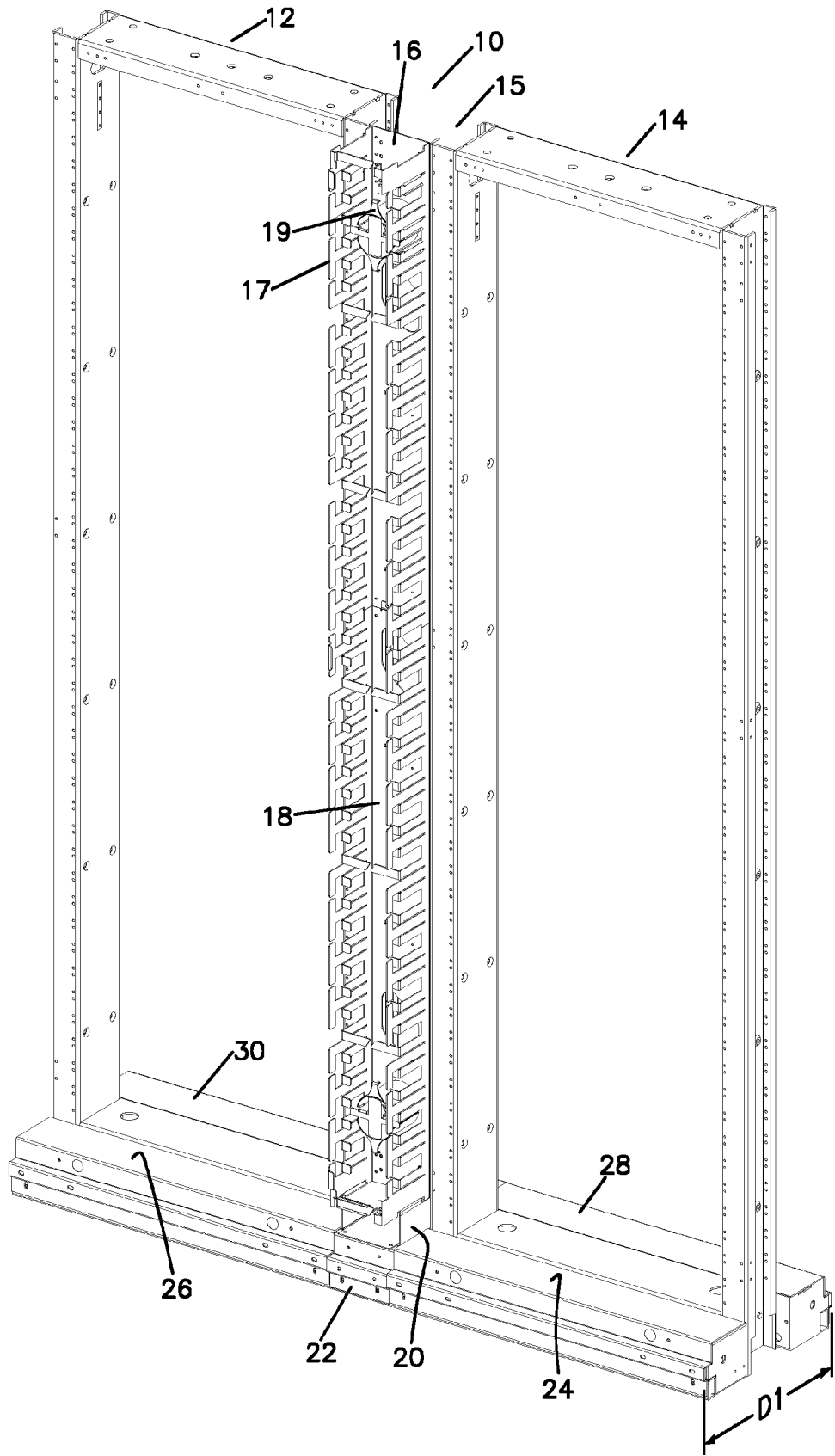
FIG. 1 is a front perspective view of an embodiment of the interbay management system between distribution frames in a first configuration.
Figure 2:
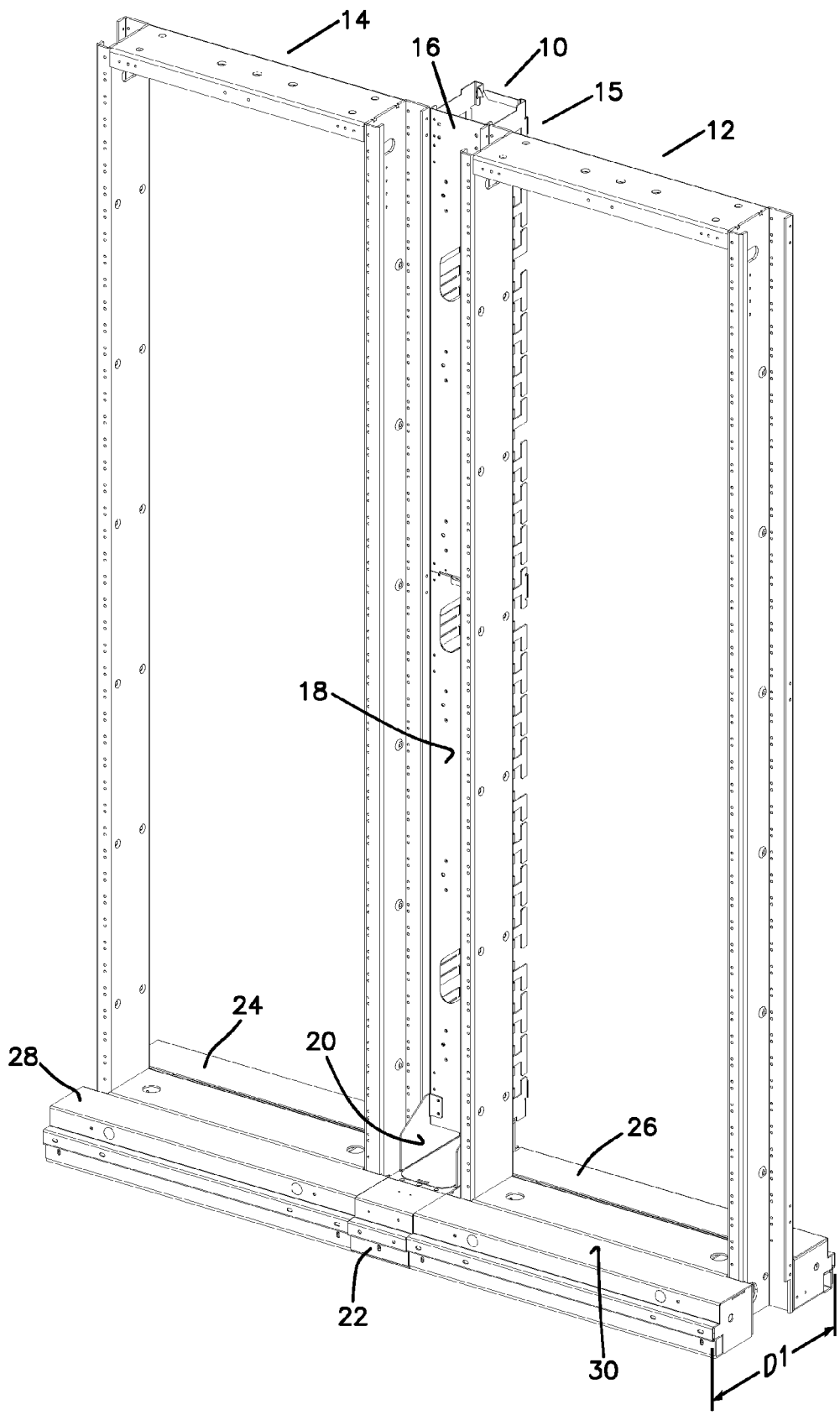
FIG. 2 is a rear perspective view of an embodiment of the interbay management system between distribution frames shown in FIG. 1.
Figure 3:
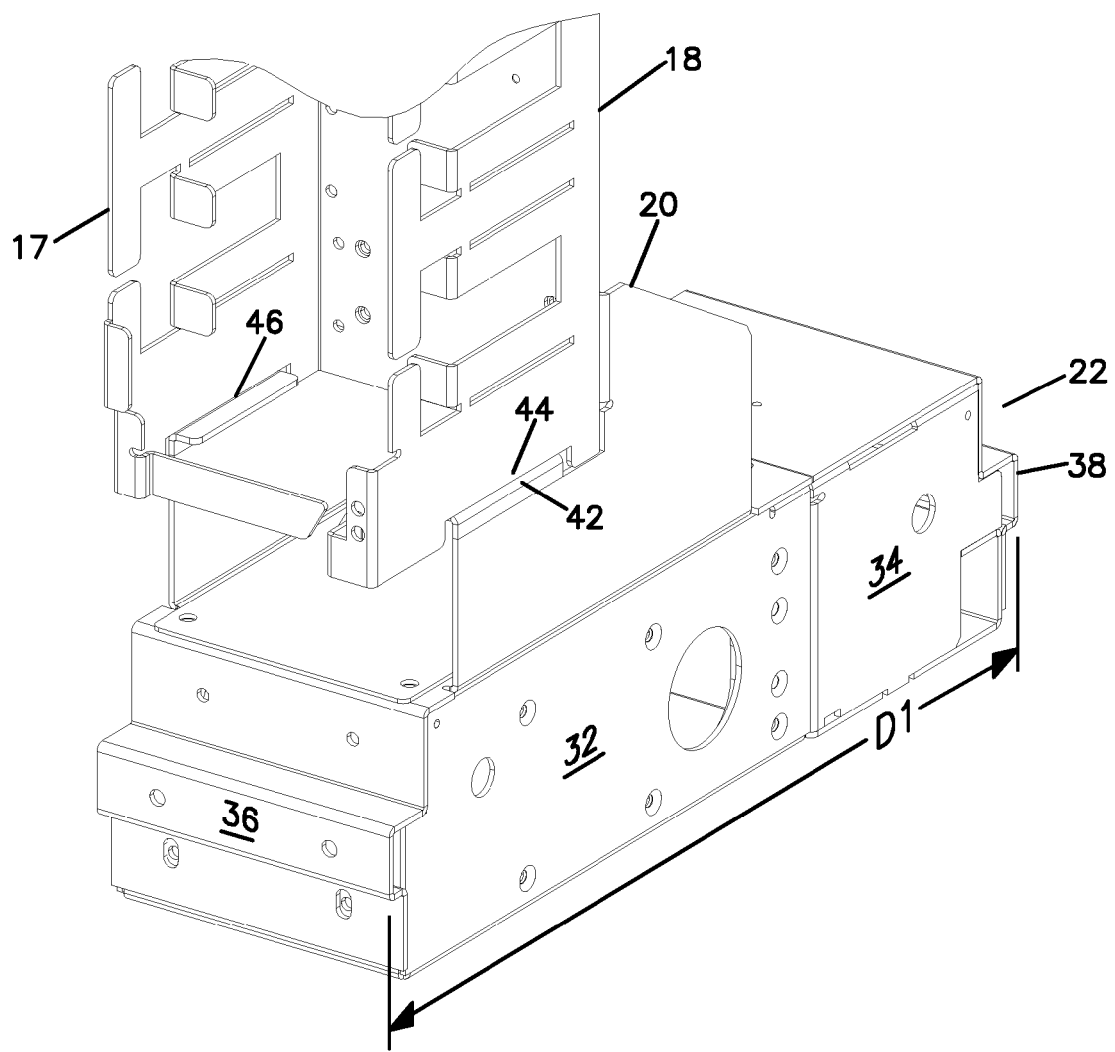
FIG. 3 is an enlarged front perspective view of a portion of the embodiment of the interbay management system shown in FIG. 1.

Referring to FIGS. 1-3, a telecommunication cable management system 10 is shown secured between adjacent fiber distribution frames 12, 14. In the depicted embodiment the fiber distribution frames are open frames that include a number of vertically arranged mounting locations supporting telecommunication components. Slack in patch cords and other cables that connect the telecommunication components on the frames can be managed (e.g., protected, routed, stored) in the cable management system 10. It should be appreciated that although the patch cord management system is shown between two adjacent fiber distribution frames, the patch cord management system could alternatively be secured to an end of a fiber distribution frame.

In the depicted embodiment, the patch cord management system 10 includes a panel 15 for managing cables extending to or from frames 12, 14 or other frame equipment. Panel 15 includes various cable management structures such as cable guides or fingers 17 and cable spools 19 for guiding cables and storing cable slack. In the depicted embodiment of cable management system 10, panel 15 is mounted to a spacer box or spacer assembly 22. Panel 15 includes an upper management column 16 that is connected to a lower management column 18. The lower column 18 is connected to a coupling member 20 of the spacer assembly 22. In the depicted embodiment the lower column 18 is supported in part on the spacer assembly 22. It should be appreciated that the upper and lower columns 16, 18 can alternatively or additionally be secured to the fiber distribution frames 12, 14 either directly or via connection components (e.g., brackets and connection plates). It should also be appreciated that alternative embodiments may include more patch cord management columns or fewer (e.g., a single column, or 3 or more columns).

In the depicted embodiment, the front face of the spacer assembly 22 is aligned with the front face of the adjacent front guard boxes 24, 26. The rear face of the spacer assembly 22 is aligned with the rear face of the adjacent rear guard boxes 28, 30. The distance D1 between the front face of the front guard boxes 24, 26 and the rear face of the rear guard boxes 28, 30 is correlated with the width of the telecommunication components that are to be supported in the distribution frames (the larger the width of the telecommunication components, the larger the distance D1). In some embodiments the distance D1 is substantially equal to the depth of the largest telecommunication component in the fiber distribution frame. In other embodiments the distance D1 is slightly larger than the width of the largest telecommunication component in the fiber distribution frame. In such embodiments the front and rear guard boxes and spacer assembly 22 serve as a bumper to protect the telecommunication components housed in the distribution frames.

In the depicted embodiment the management panel 15 is mounted to the coupling member 20 at the front portion of the spacer assembly 22. This configuration results in the management panel 15 being generally aligned with the front faces of the telecommunication components mounted in the distribution frames. In other words, the management panel 15 is arranged to be in generally the same plane as the front faces of the telecommunication circuitry in the fiber distribution frames. The close proximity and orientation is desirable for efficiency and ease of use.

Figure 4:
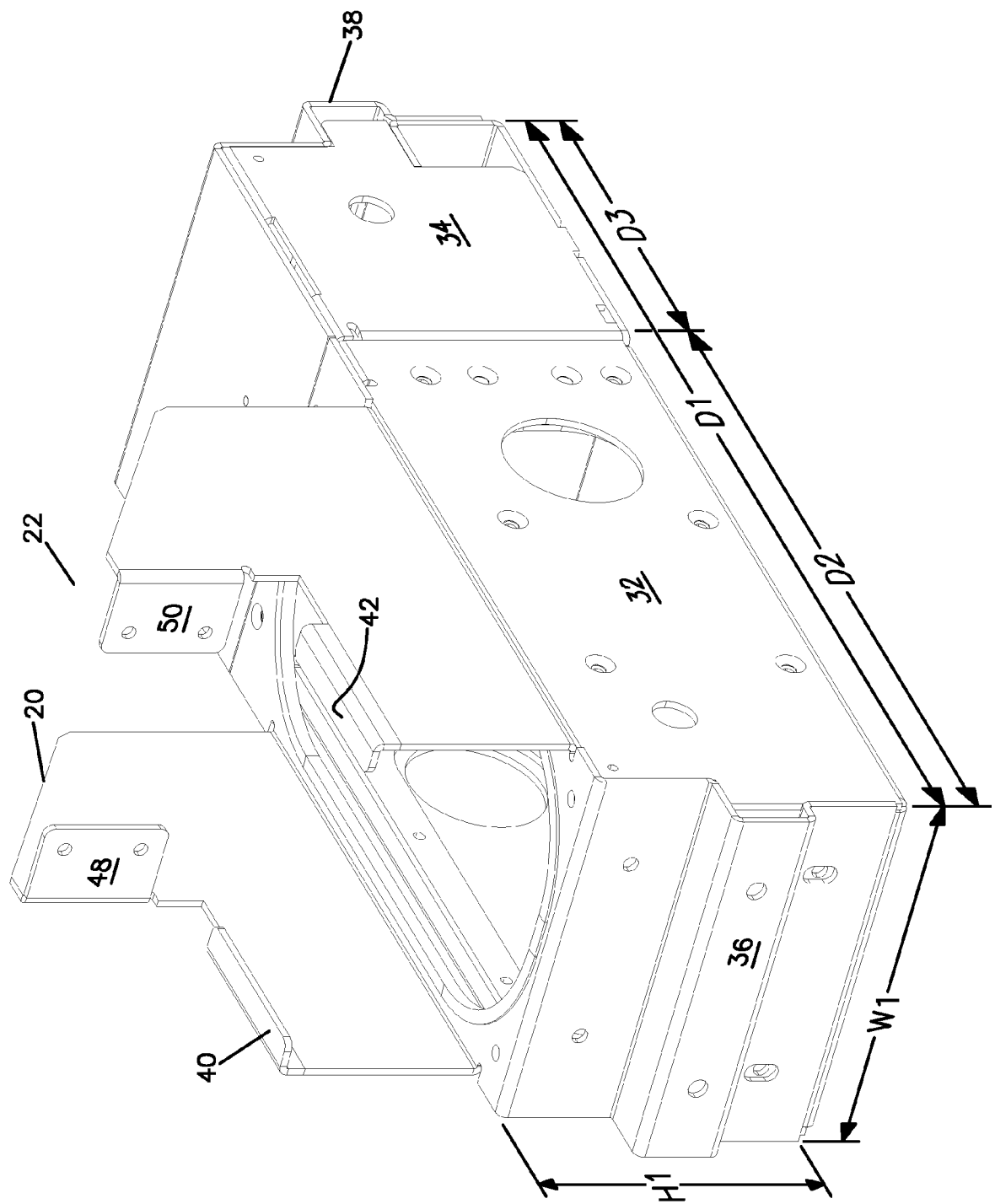
FIG. 4 is a front perspective view of the spacer assembly shown in FIG. 3.
Figure 5:
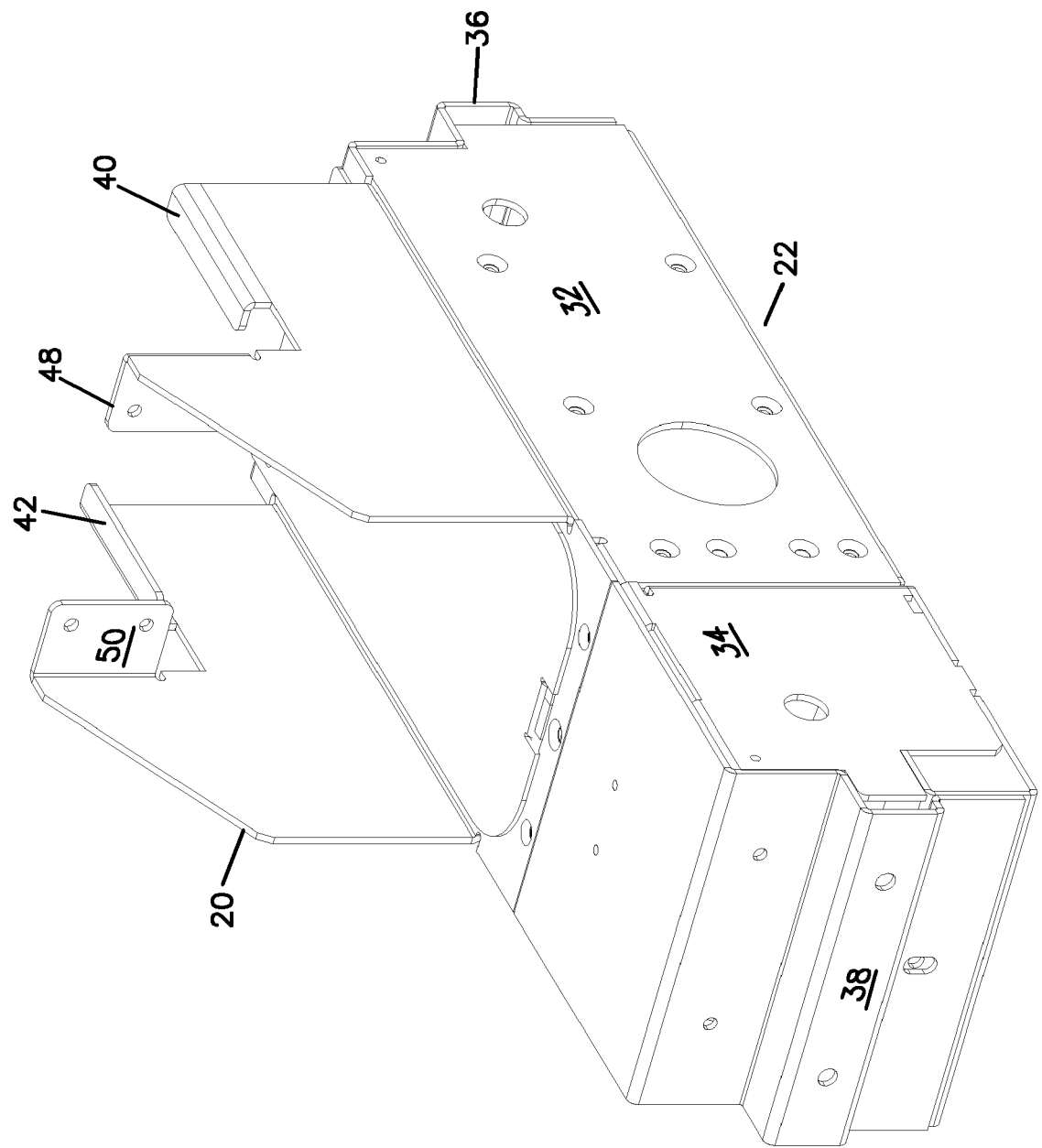
FIG. 5 is a rear perspective view of the spacer assembly shown in FIG. 3.

Referring to FIGS. 4-5, the spacer assembly 22 will be described in greater detail. In the depicted embodiment the spacer assembly 22 includes a front spacer 32 and a rear spacer 34. The front spacer 32 includes a width W1, a height H1, and a length D2. The width W1 generally corresponds to the width of the management panel 15. The width W1 also defines a minimum distance between adjacent distribution frames 12 and 14 when the management systems are located therebetween. In the depicted embodiment the width W1 is substantially equal to the distance between adjacent distribution frames 12 and 14. The rear spacer 34 includes a width, a height, and a length D3. In the depicted embodiment the width and height of the rear spacer 34 are substantially the same as the width and height of the front spacer 32. In the depicted configuration the length D1 of the spacer assembly 22 is the combination of the lengths of the front spacer D2 and the rear spacer D3.

In the depicted embodiment the front face of the front spacer 32 includes a support rail 36 and the rear face of the rear spacer 34 includes a support rail 38. The support rails can be used to provide support for cables (e.g., power cords or strips) that travel horizontally across the spacer and guard boxes.

Figure 12:
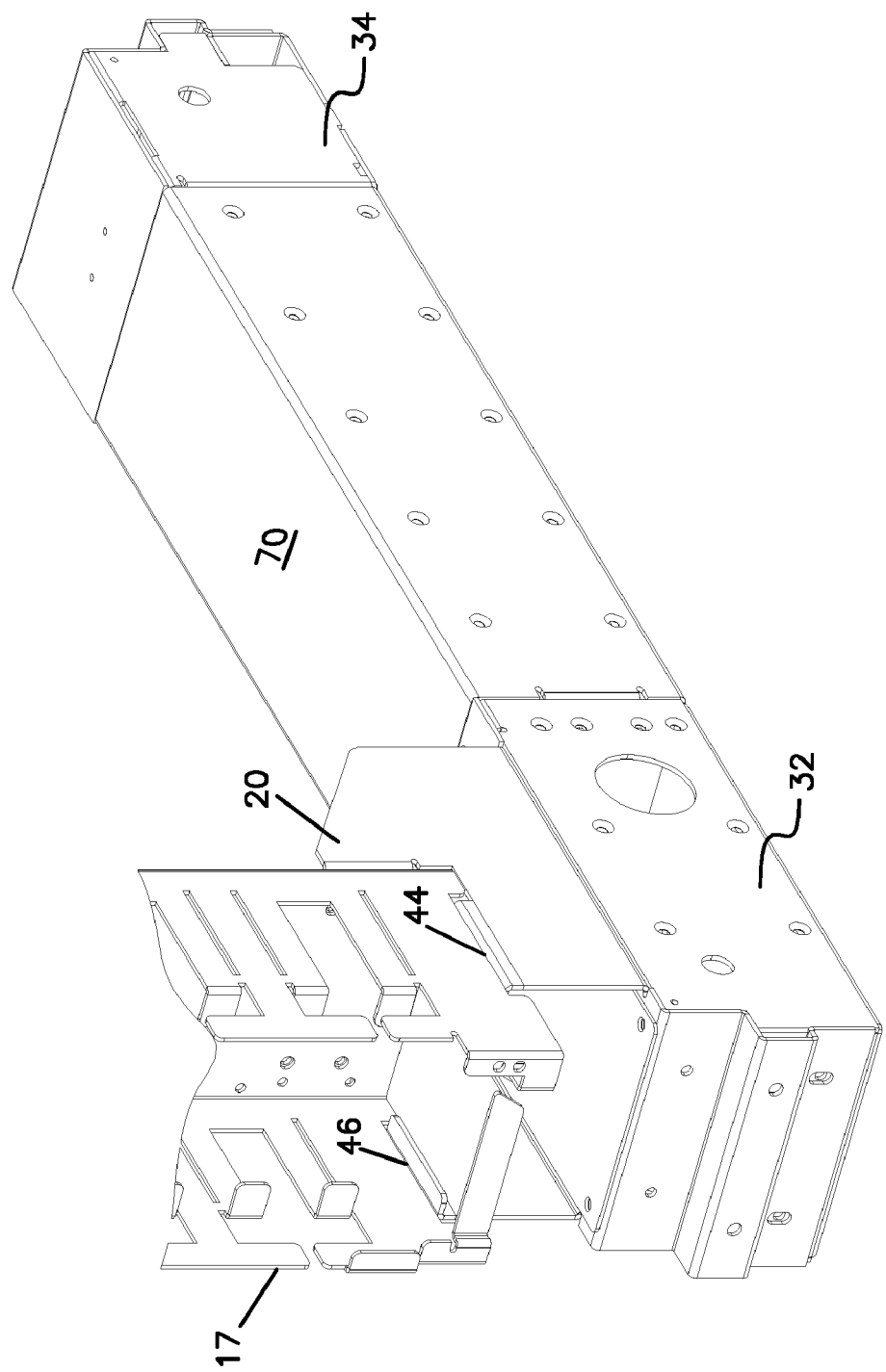
FIG. 12 is an enlarged front perspective view of a portion of the embodiment of the interbay management system shown in FIG. 10.
Figure 13:
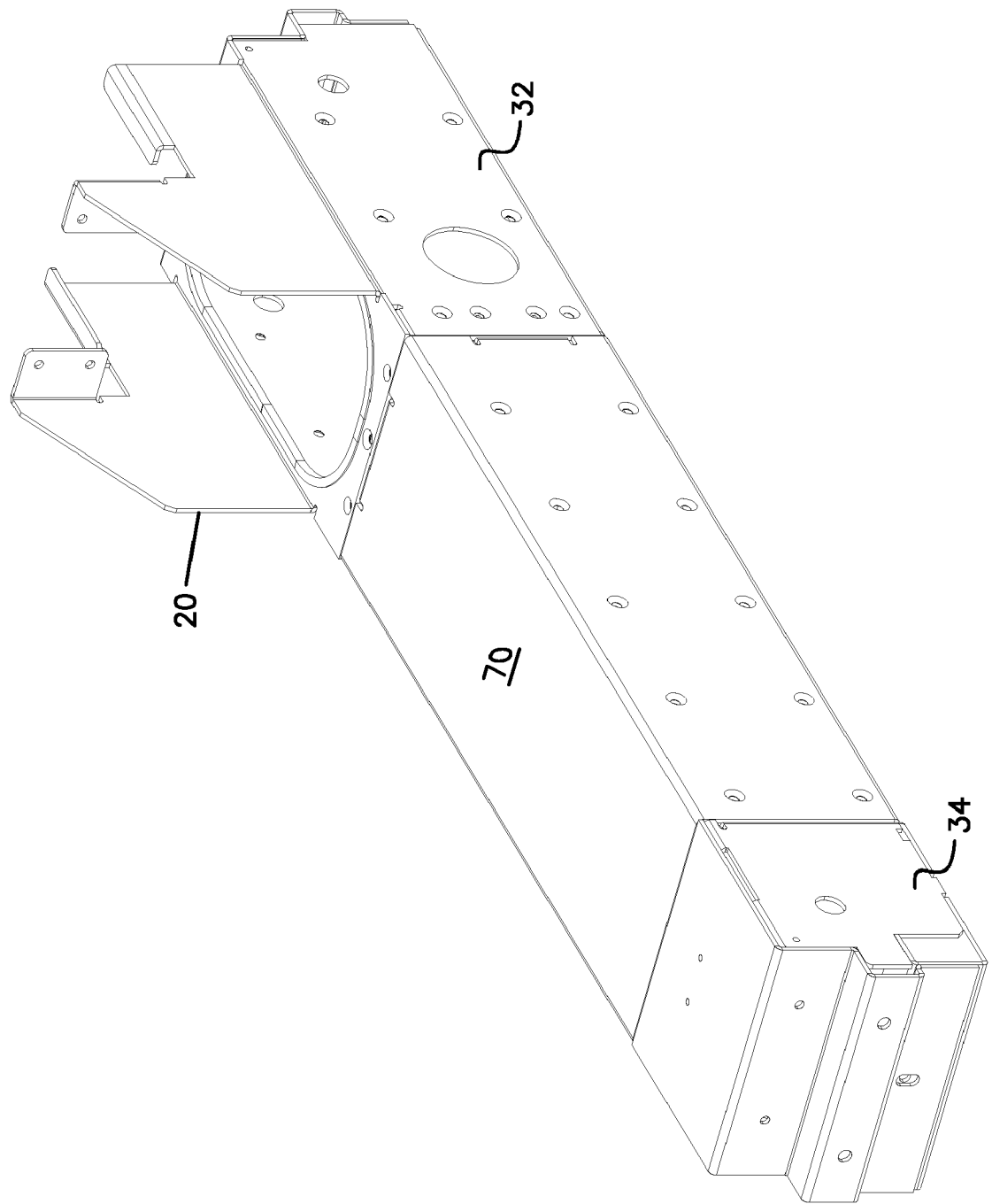
FIG. 13 is an enlarged rear perspective view of a portion of the embodiment of the interbay management system shown in FIG. 10.

In the depicted embodiment the coupling member 20 is connected to the top of the front spacer 32. The coupling member 20 includes supports that connect to the lower management column 18. In the depicted embodiment the coupling member 20 includes two generally horizontal support members 40, 42 that contact the end of the lower management column 18. In the depicted embodiment the horizontal support members 40, 42 are received in notches 44, 46 on the lower patch cord management column 18 (see FIGS. 3 and 12). The coupling member 20 of the depicted embodiment also includes a pair of vertical flanges 48, 50. The vertical flanges 48, 50 are configured to be fastened to the back wall of the lower management column 18.

Figure 6:
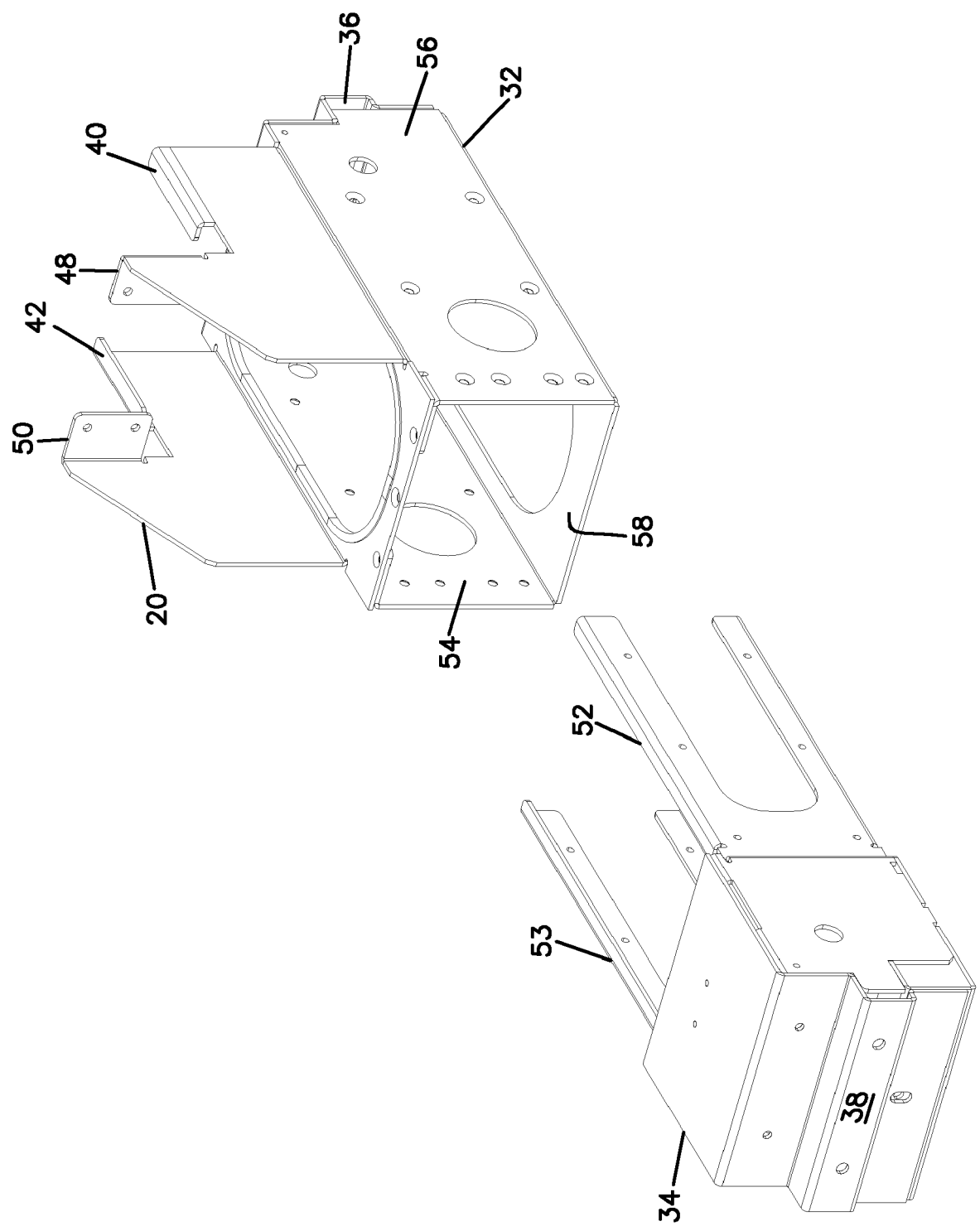
FIG. 6 is a rear assembly view of the spacer assembly shown in FIG. 3.
Figure 7:
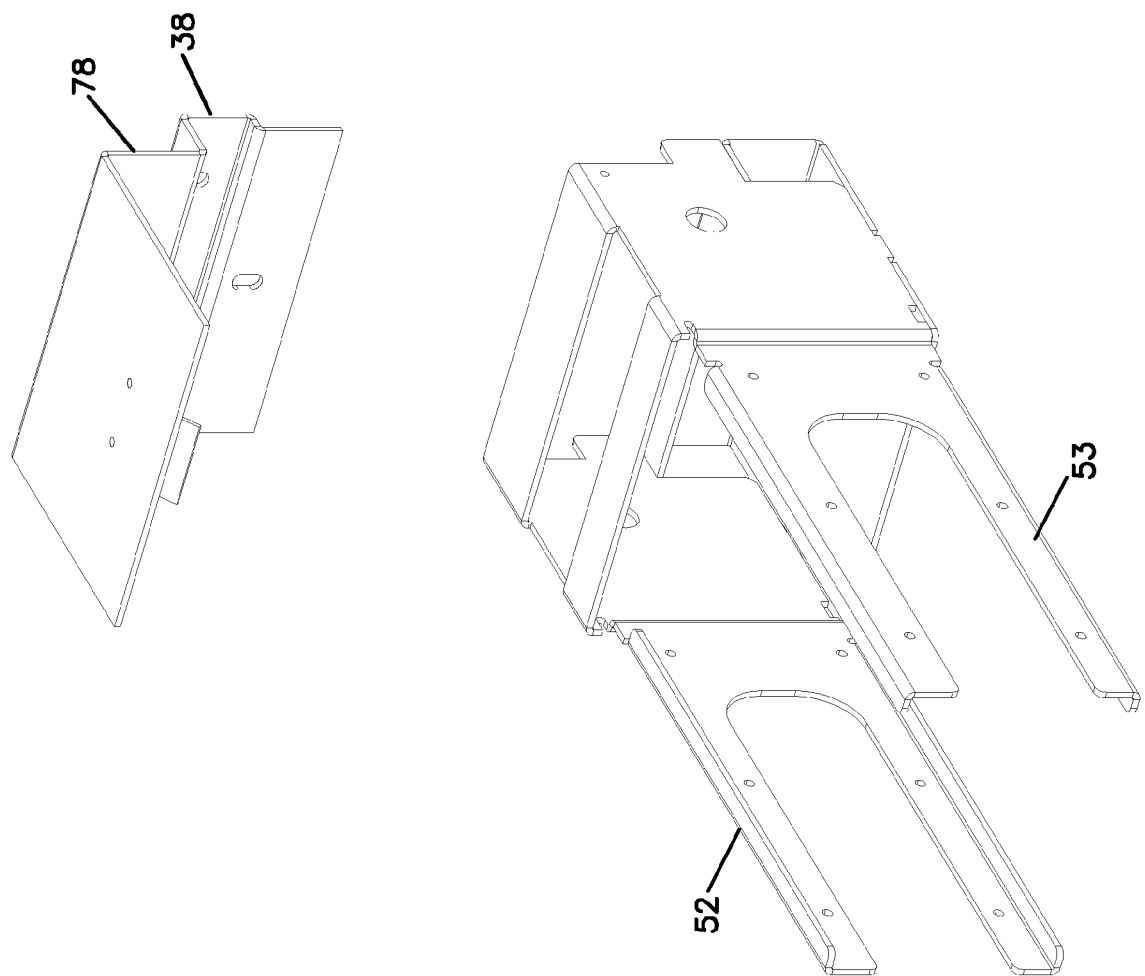
FIG. 7 is a rear assembly view of the rear spacer component of the spacer assembly shown in FIG. 3.
Figure 8:
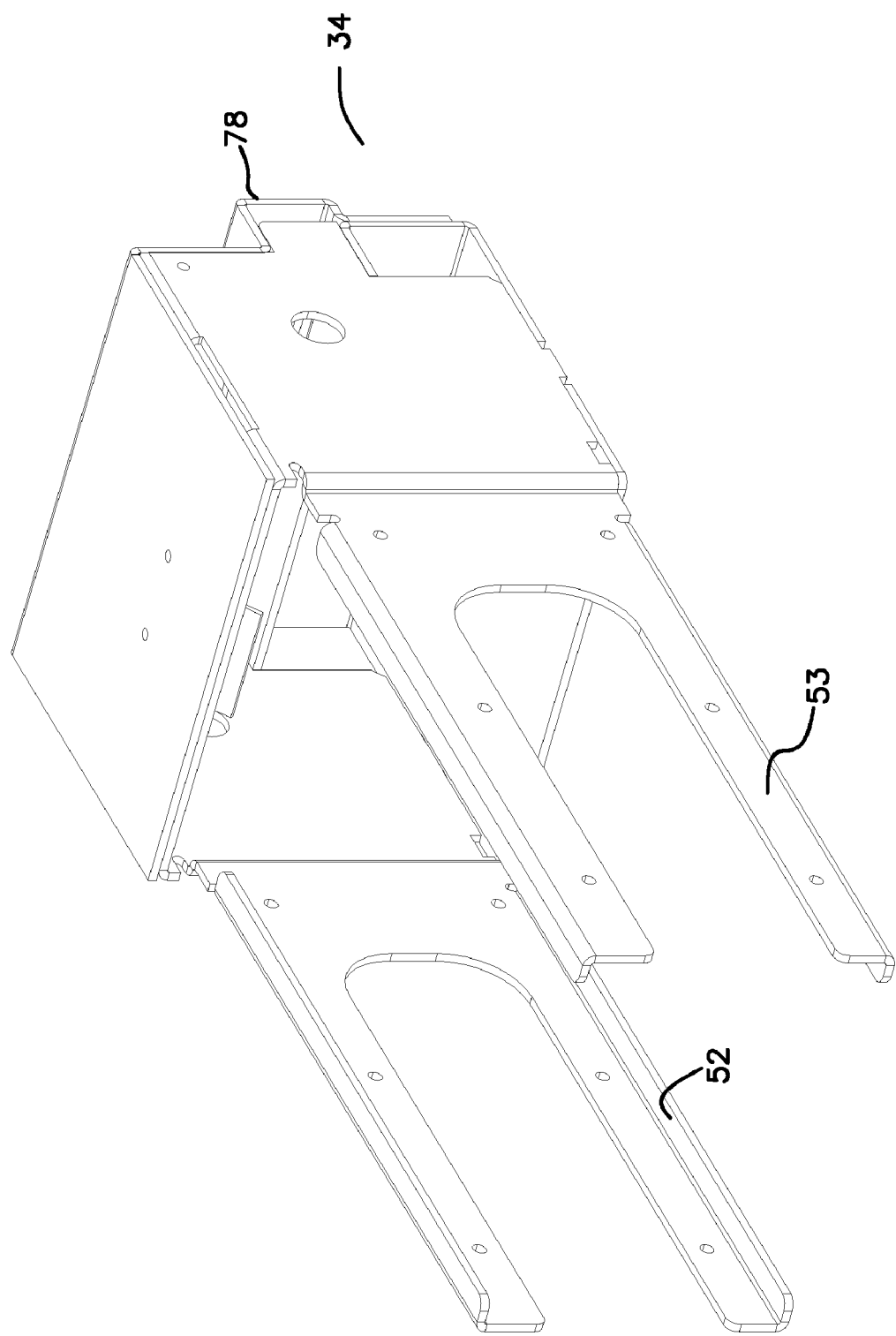
FIG. 8 is an assembled view of the rear spacer component of the spacer assembly shown in FIG. 3.

Referring to FIGS. 6-8, the structure of the rear spacer 34 is described in greater detail. In the depicted embodiment, the rear spacer 34 includes connection members 50, 52 that extend into the front spacer 32 and can be connected to the side walls of the front spacer 32. It should be appreciated that in alternative embodiments the connection members 50, 52 could alternatively extend from the front spacer 32 to the rear spacer 34 and the connection members could alternatively extend along the outside of the side wall.

In the depicted embodiment the rear spacer 34 is box shaped and includes a guard plate 78 that attaches over and caps the upper and rear portions of the rear spacer. Until the guard plate 78 is installed inside of the rear spacer it is easy to access, which allows operators to run cables and fasteners therethrough. It should be appreciated that the guard plate 78 can be connected to the rear spacer 34 before of after the management system is positioned between or adjacent to the fiber distribution panels.

Figure 9:
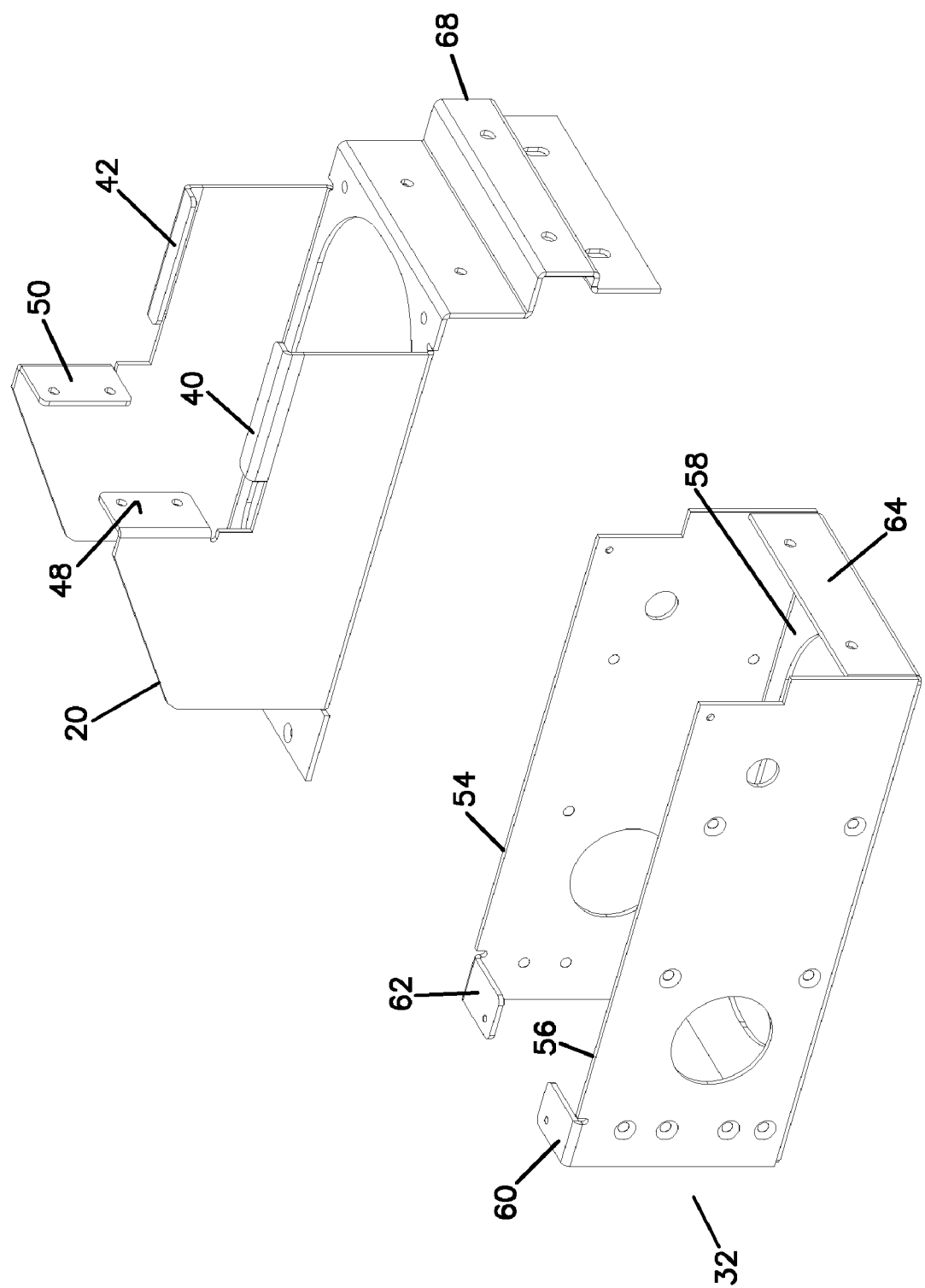
FIG. 9 is an assembly view of the front spacer component of the spacer assembly shown in FIG. 3.

Referring to FIG. 9, the structure front spacer 32 is described in greater detail. In the depicted embodiment the front spacer 32 includes a box shaped configuration with opposed side walls 54, 56 and a bottom wall 58 that connects the side walls. In the depicted embodiment the lack of the top wall enables easy access into the front spacer 32 until the coupling member 20 is connected thereto. The coupling member 20 extends over the top of the front spacer and includes a guard plate 68 that extends over the front face of the front spacer 32. The coupling member 20 caps the front spacer 32 and defines a space therein. The front spacer includes upper flanges 60, 62 and a lower flange 64 for connection to the coupling member 20. The side walls of the front spacer include apertures for receiving fasteners for connecting the front spacer to the connection members 52, 53 of the rear spacer 34 or other structures (e.g., the mid spacer described below).

As discussed above, in some embodiments it is preferable that the front face of the spacer assembly 22 be aligned with the front face of the adjacent front guard boxes 24, 26 and the rear face of the spacer assembly 22 is aligned with the rear face of the adjacent rear guard boxes 28, 30. Since in some embodiments, the distance between the front face of the front guard boxes 24, 26 and the rear face of the rear guard boxes 28, 30 is correlated with the depth of the telecommunication components, it can be desirable to shorten or lengthen the spacer assembly 22. In some embodiments alignment between the front and rear faces of the spacer assembly with the front and rear guard boxes is advantageous as it allows objects (e.g., a ladder) to roll or slide across the front or rear of the frames without interruption.

Referring to FIGS. 10-15, the cable management system 10 is shown in different configurations that include mid spacers 70 of varying lengths. FIGS. 10-14 show the patch cord management system in a configuration that includes a mid spacer that has a length D5. In the depicted configuration D5 is about 15 inches long, which makes the spacer in this configuration about twice the length shown in the first configuration, which is absent a mid spacer. In other words, in the depicted embodiment D1 is about 15 inches long and D4 is about 30 inches long. As discussed above, this flexibility in length enables the spacer assembly 22 to be adjusted so that its front and rear faces are aligned with the front and rear guard boxes 24, 26, 28, 30. The length of the spacer assembly 22 can be adjusted based on the depth of the telecommunication components supported on the distribution frames.

As shown in the depicted embodiment, the management column can in some cases be free-standing (supported by the spacer box which is connected to the fiber distribution frame). The patch cord management system being modular allows it to be more easily assembled, disassembled, and reconfigured. Parts of the assembly of the system can occur somewhere other than in the tight space between the fiber distribution frames. Also, given the secure connection between the spacer assembly 22 and the management panel 15, in some cases, fewer structural connections are needed between the fiber distribution frames 12, 14 and the management panel 15.

Figure 14:
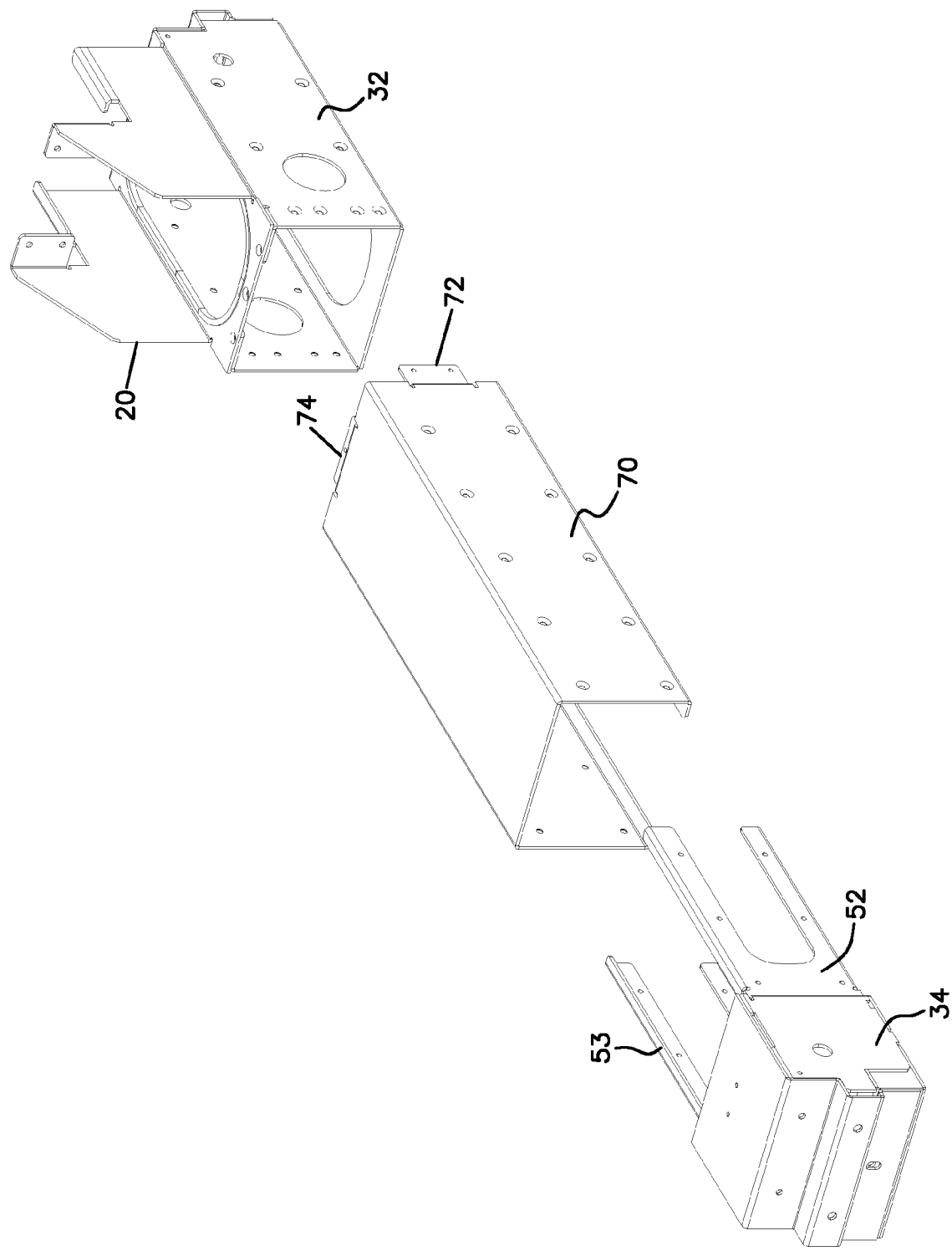
FIG. 14 is an assembly view of a portion of the embodiment of the interbay management system shown in FIG. 13.
Figure 15:
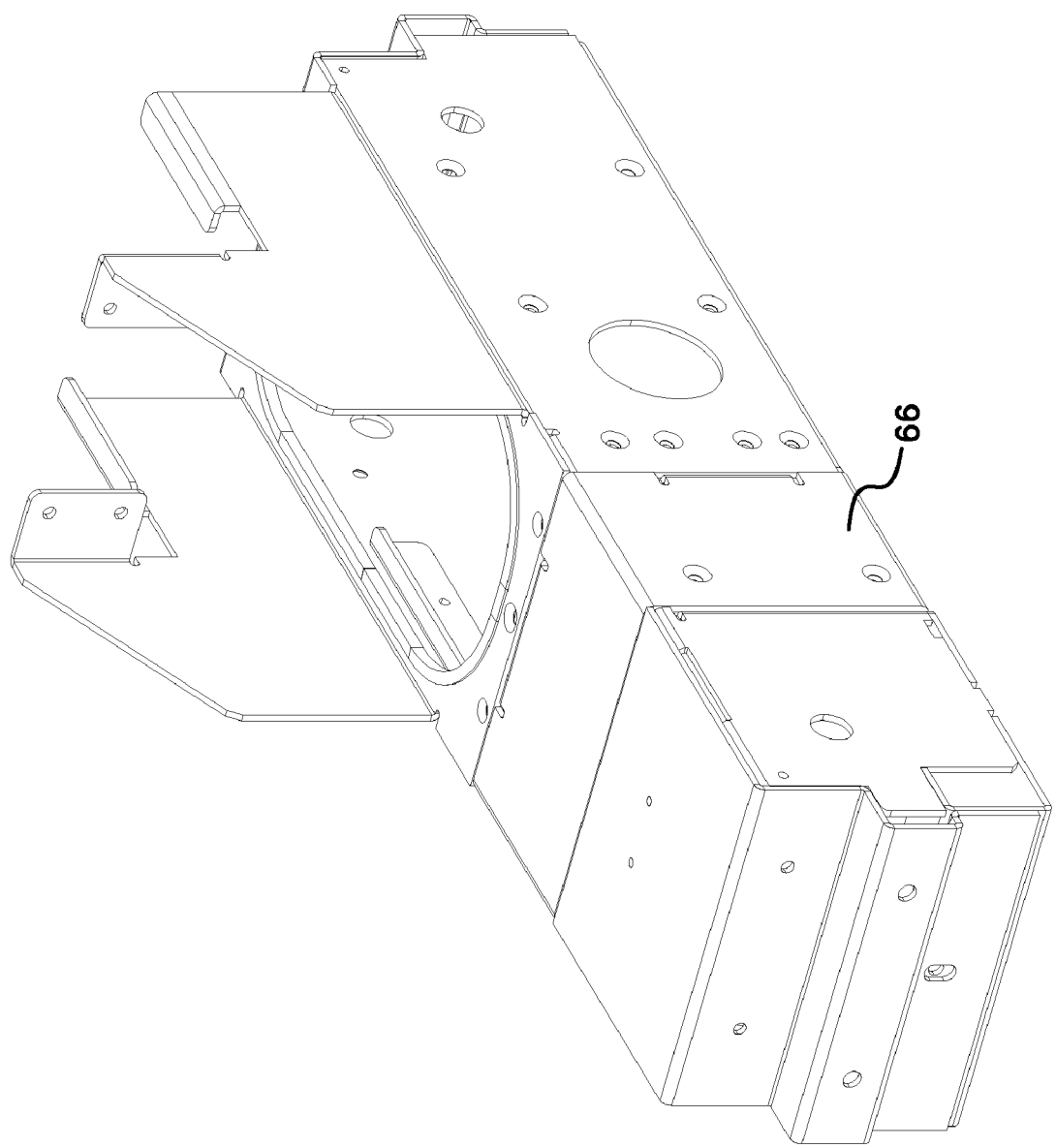
FIG. 15 is a front perspective view of the spacer assembly of the interbay management system in a third configuration.

Referring to FIG. 14, the mid spacer 70 is configured to be secured to the connection members 52, 53 of the rear spacer 34. The mid spacer 70 includes a tab 72 that connects to the side walls of the front spacer 32 and a tab 74 that connects to the bottom wall of the coupling member 20. FIG. 15 illustrates the patch cord management system in a third configuration that includes a mid spacer 66 that is shorter than the mid spacer 70. It should be appreciated that many other mid spacer lengths are also possible.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An interbay spacer box comprising:
   a front spacer including a height and a width;
   a rear spacer, the rear spacer configured to be connected to the front spacer; and
   a coupling member connected above the front spacer, the coupling member including mounts for connection to a cable management panel;
   wherein the front spacer, rear spacer, and coupling members are configured such that when assembled the front spacer and rear spacer together form a box structure that includes a height and width that are substantially the same as the height and width of the front spacer,
      wherein the front and rear spacers include vertical opposed side walls and at least a horizontal top or bottom wall connected to the side walls.

2. The interbay spacer box of claim 1, wherein a portion of the rear spacer is configured to slide between the vertical opposed side walls of the front spacer and is configured to connect to at least one of the side walls.

3. An interbay spacer box comprising:
   a front spacer including a height and a width;
   a rear spacer, the rear spacer configured to be connected to the front spacer; and
   a coupling member connected above the front spacer, the coupling member including mounts for connection to a cable management panel;
   wherein the front spacer, rear spacer, and coupling members are configured such that when assembled the front spacer and rear spacer together form a box structure that includes a height and width that are substantially the same as the height and width of the front spacer, wherein the mounts of the coupling member include a first coupling flange and a second coupling flange, wherein the first and second coupling flanges are at different angles relative to a horizontal plane.

4. The interbay spacer box of claim 3, wherein the first coupling flange is generally horizontal and configured to be received in a notch on a bottom edge of the cable management panel, and the second coupling flange is generally vertical.

5. An interbay spacer box comprising:
   a front spacer including a height and a width;
   a rear spacer, the rear spacer configured to be connected to the front spacer; and
   a coupling member connected above the front spacer, the coupling member including mounts for connection to a cable management panel;
   wherein the front spacer, rear spacer, and coupling members are configured such that when assembled the front spacer and rear spacer together form a box structure that includes a height and width that are substantially the same as the height and width of the front spacer, further comprising a mid spacer configured to be connected between the front and the rear spacers such that when the front, rear, and mid spacers are connected, the assembled structure includes a height and width that is substantially the same as the height and width of the front spacer.

6. The interbay spacer box of claim 5, wherein the mid spacer includes vertical opposed side walls and at least a horizontal top or bottom wall connected to the side walls.

7. The interbay spacer box of claim 6, wherein the rear spacer includes a portion that is configured to slide between the side walls of the mid spacer and connect to at least one of the side walls.

8. The interbay spacer box of claim 7, wherein the front spacer includes vertically opposed side walls and wherein a portion of the rear spacer is configured to slide between the vertical opposed side walls of the front spacer and connect to at least one of the side walls.

9. An interbay management panel comprising:
   a front spacer including a height and a width;
   a rear spacer including a height and a width;
   a coupling member connected above the front spacer including mounting flanges; and
   a cable management panel connected to the mounting flanges of the coupling member;
   wherein the front and rear spacers are configured such that when the front and rear spacers are connected, the overall height and overall width of the structure are substantially the same as the height and width of the front spacer, further comprising a mid spacer configured to be connected between the front and the rear spacers.

10. The interbay management panel of claim 9, wherein the front, rear, and mid spacers each include vertical opposed side walls and at least a horizontal top or bottom wall connected to the side walls.

11. The interbay management panel of claim 10, wherein a portion of the rear spacer is configured to slide between the vertical opposed side walls of the front spacer and is configured to connect to at least one of the side walls.

12. The interbay management panel of claim 11, wherein a portion of the rear spacer is configured to slide between the vertical opposed side walls of the mid spacer and connect to at least one of the side walls.

13. A method of connecting an interbay management panel between adjacent bays comprising:
   connecting a front spacer to a rear spacer;
   mounting a cable management panel above the front spacer;
   positioning the cable management panel and spacer assembly between adjacent distribution frames;
   securing the cable management panel and spacer assembly to the distribution frames, and wherein the step of connecting the front spacer to the rear spacer includes the step of securing a mid spacer therebetween.

14. The method of claim 13, wherein the step of connecting the front spacer to the rear spacer includes sliding portions of the rear spacer into the mid spacer and connecting the portions of the rear spacer to the mid spacer.

15. A method of connecting an interbay management panel between adjacent bays comprising:
   connecting a front spacer to a rear spacer;
   mounting a cable management panel above the front spacer;
   positioning the cable management panel and spacer assembly between adjacent distribution frames;
   securing the cable management panel and spacer assembly to the distribution frames, further comprising the step of selecting a mid spacer so that the overall length of the spacer assembly is correlated to the depth of the telecommunication component that will be mounted to the adjacent distribution frames.

16. The method of claim 13, wherein the step of mounting the cable management panel above the front spacer includes the step of mounting a coupling member to the front spacer and mounting the cable management panel to the coupling member.

17. A method of assembling an interbay spacer block comprising:
   selecting a mid spacer having a length based on a particular application;

sliding a portion of a rear spacer into a first end of the mid spacer and connecting the portion of the rear spacer that is within the mid spacer to the mid spacer; and sliding a portion of a second end of the mid spacer into the front spacer and connecting the portion of the mid spacer that is within the front spacer to the front spacer.

18. An interbay spacer box comprising:

a front spacer block;

a rear spacer block;

a mid spacer block including two opposed side walls and a top wall connecting the opposed side walls;

wherein the front spacer block is mountable to the rear spacer block in a first orientation;

wherein the mid spacer block connects the front spacer block to the rear spacer block in a second orientation;

wherein portions of the rear spacer block are in contact with the inside surface of the side walls of the mid spacer block in the second orientation; and wherein tabs extending from the side walls of the mid spacer block are connected to side walls of the front spacer block in the second orientation.

* * * * *